(12) United States Patent
Peterson

(10) Patent No.: US 7,436,946 B1
(45) Date of Patent: Oct. 14, 2008

(54) RELIABLE CALL PROGRESS INDICATION FOR SIP

(75) Inventor: David Peterson, San Jose, CA (US)

(73) Assignee: Network Equipment Technologies, Fremont, CA (US)

( * ) Notice: Subject to any disclaimer, the term of this patent is extended or adjusted under 35 U.S.C. 154(b) by 1058 days.

(21) Appl. No.: 10/386,212

(22) Filed: Mar. 10, 2003

(51) Int. Cl.
 H04M 3/42 (2006.01)
(52) U.S. Cl. ............... 379/212.01; 370/356; 370/401; 379/900; 709/249
(58) Field of Classification Search ........ 370/352, 370/356, 401; 709/218, 249; 379/212.01, 379/900
See application file for complete search history.

(56) References Cited

U.S. PATENT DOCUMENTS 6,735,621 B1 * 5/2004 Yoakum et al. ............ 709/218

6,937,597 B1 * 8/2005 Rosenberg et al. .......... 370/356

OTHER PUBLICATIONS

Rosenberg et al., "Reliability of Provisional Responses in the Session Initiation Protocol (SIP)" The Internet Society, 14 pages, (2002).
Rantapuska, "SIP Call Security in an Open IP Network", Helsinki University of Technology, Telecommunications Software and Multimedia Laboratory, May 28, 2003, 14 pages.

* cited by examiner

*Primary Examiner*—Gerald Gauthier
(74) *Attorney, Agent, or Firm*—Townsend and Townsend and Crew, LLP

(57) ABSTRACT

A method for communicating with a device in an unreliable messaging environment is provided. The method comprises: repeatedly sending an invite signal to the device, wherein the invite signal is sent until a ringing response is received from the device; receiving a ringing response from the device in response to the device receiving the invite signal; and ceasing to send the invite signal to the device when the ringing response is received from the device.

26 Claims, 4 Drawing Sheets

RELIABLE CALL PROGRESS INDICATION FOR SIP

CROSS-REFERENCES TO RELATED APPLICATIONS

The present application is related to U.S. patent application Ser. No. 10/385,675 entitled "GATEWAY FOR CONVERSION OF MESSAGES BETWEEN MULTIPLE PROTOCOLS USING SEPARATE SESSIONS", filed on Mar. 10, 2003, which is hereby incorporated by reference, as if set forth in full in this document, for all purposes.

BACKGROUND OF THE INVENTION

The present invention generally relates to data communications and more specifically to a system and method for providing reliable call progress messaging between devices.

Protocols are provided that define how telephonic devices can communicate between each other. For example, session initiation protocol (SIP) defines the standards that Internet Protocol (IP) based telephones use in order to enable a telephone call. In the SIP protocol, telephones, or devices related to the telephones (e.g., switches, servers, etc.), send messages to each other in a request and answer sequence. In a typical call progress sequence, a first phone will repeatedly send an invite request to a second phone. The invite request is a request to start a conversation. The second device then sends a trying response to the first device when the invite request is received. Once receiving the trying response, the first telephone stops sending the invite request. Accordingly, the SIP protocol is defined so that the first telephone will repeatedly send an invite request until a trying response is received from the second telephone.

After the trying response is sent by the second device, a ringing response is sent when the second telephone starts ringing. The effect of receiving a ringing response at the first device causes the first device to produce a ringing sound at the first device. This alerts the user at the first device that the second device is ringing. The SIP protocol calls for the ringing response to be only sent once. When the second device is activated or picked up by a user, a success response is then sent that indicates that the phone has been picked up. The users of the first and second telephone can now communicate.

The above method has many disadvantages. For example, messages may be lost and not received by a device because the messaging environment that the SIP devices operate in is not reliable. Thus, for example, the ringing response may be lost thereby causing the user to not hear that the second device is ringing. Instead, the user just hears silence and may not know the proper call progress. This problem is exacerbated in the case where the communication is between a SIP telephone and a public switch telephone network (PSTN) telephone. Because of the differences between the SIP protocol that a SIP phone uses and a PSTN protocol that a PSTN phone uses, an audio inband response was created. The audio inband response is provided to allow PSTN telephones to be compatible with and communicate with SIP telephones. The audio inband response includes actual audio information (e.g., ringing sounds, busy sounds, off hook sounds, etc.) from the PSTN phone and the audio information is produced at the first device. In contrast, when two SIP devices communicate, the ringing response is sent from the second device to the first device and then the ringing sound is generated at the first device. Thus, SIP devices do not send audio information. The audio inband response, however, includes actual audio information that is generated at the PSTN device. Thus, the audio information may include ringing but may also include other types of audio such as a busy signal or audio typically heard when the call cannot be completed. Consequently, losing an inband audio response that indicates that the second telephone is busy or cannot be connected may cause a user to needlessly stay on the line when there is no chance that the second device will ever be picked up. In either of the above cases, however, a user of the first device may not receive the proper call progress indications because messages are lost.

BRIEF SUMMARY OF THE INVENTION

Embodiments of the present invention generally relate to reliable call progress messaging. In one embodiment of the present invention, a method for communicating with a device in an unreliable messaging environment is provided. The method comprises: repeatedly sending an invite signal to the device, wherein the invite signal is sent until a ringing response is received from the device; receiving a ringing response from the device in response to the device receiving the invite signal; and ceasing to send the invite signal to the device when the ringing response is received from the device.

In another embodiment, a method for communicating between a first device and a second device in an unreliable messaging environment is provided. The method comprises: repeatedly receiving an invite signal from the first device; repeatedly sending the invite signal to the second device; suppressing any trying responses received from the second device; receiving a ringing response from the second device in response to the second device receiving the invite signal; and ceasing to send the invite signal to the second device when the ringing response is received.

A further understanding of the major advantages of the invention herein may be realized by reference to the remaining portions of the specification and the attached drawings.

DETAILED DESCRIPTION OF THE INVENTION

Figure 1:
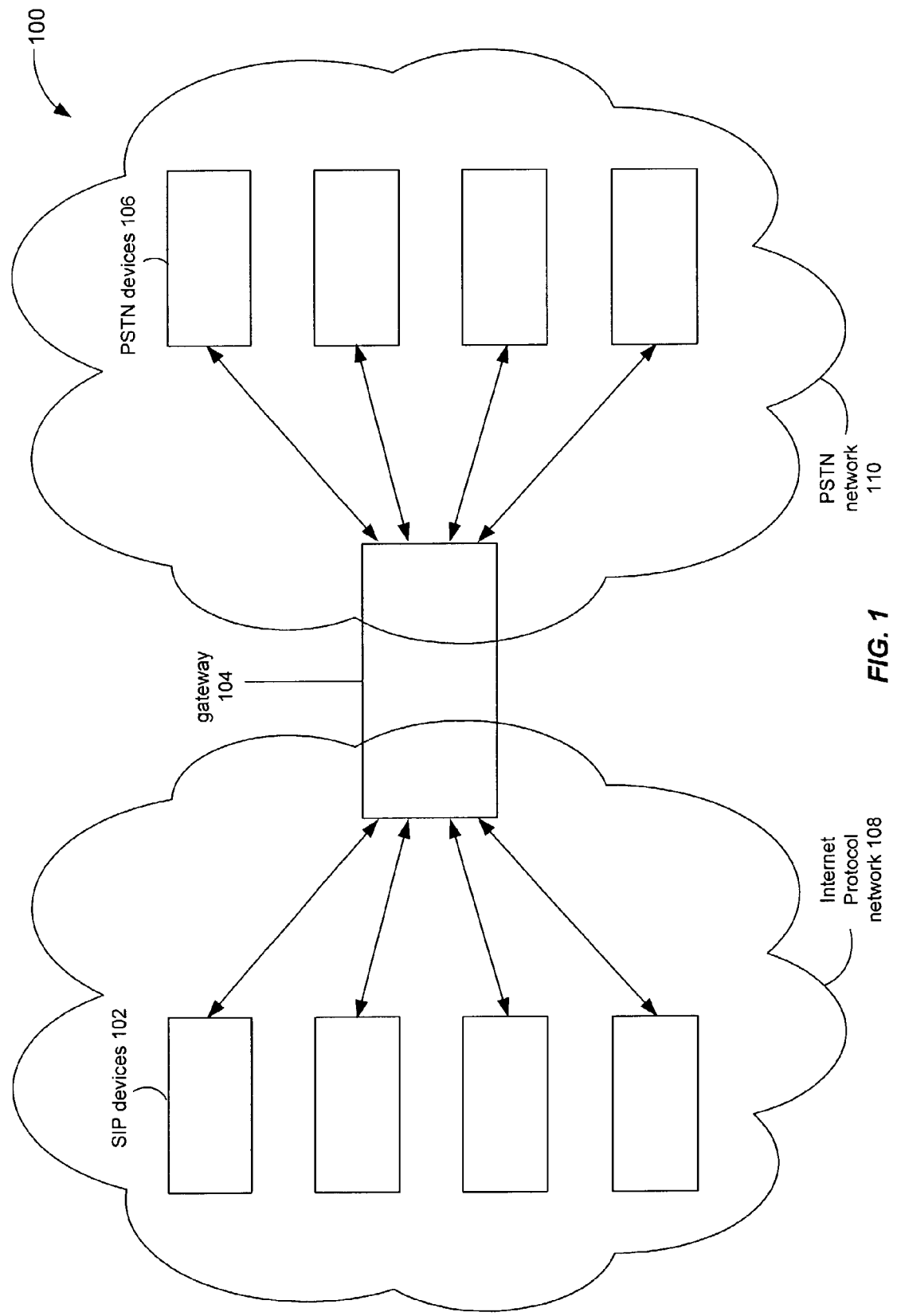
FIG. 1 depicts a simplified block diagram of a communications system that enables messaging between devices according to one embodiment of the present invention.

FIG. 1 depicts a simplified block diagram of a communications system 100 that enables messaging between devices according to one embodiment of the present invention. System 100 includes SIP devices 102, a gateway 104, and PSTN devices 106. SIP devices 102 are situated on an Internet Protocol (IP) network 108 and public switched telephone network (PSTN) devices 106 are situated on a PSTN network 110. Although embodiments of the present invention will be described as using SIP devices 102 and PSTN devices 106, it will be understood that devices other than SIP and PSTN devices may be used, such as IP devices, cellular phones, personal digital assistants (PDAs), analog phones, digital phones, wireless devices, wire line devices, or any other device compatible with an IP network 108 or PSTN network 110. Also, IP network 108 may be any packet switched network and it will be understood that networks other than the IP network 108 may be used, such as a wireless network, a local area network (LAN), a wide area network (WLAN), an asynchronous transfer mode (ATM) network, a frame relay network, etc.

SIP devices 102 may be any device that enables communication with another SIP device 102 or a PSTN device 106. For example, SIP device 102 may be a SIP telephone, a switch as connected to a SIP telephone, a SIP proxy, a SIP agent for a SIP telephone, etc. SIP devices 102 communicate using a SIP protocol. It will be understood that other IP devices that communicate in other IP protocols, such as H.323, and the like, may be used.

PSTN devices 106 include any device that enables communication between another PSTN device 106 or SIP device 102. For example, PSTN devices 106 may include a switch, a PSTN telephone, an agent for a PSTN telephone, a PSTN proxy, etc. PSTN devices 106 communicate using a PSTN protocol, such as a channel associated signaling (CAS) protocol, SS7, ISDN, and the like.

Figure 2:
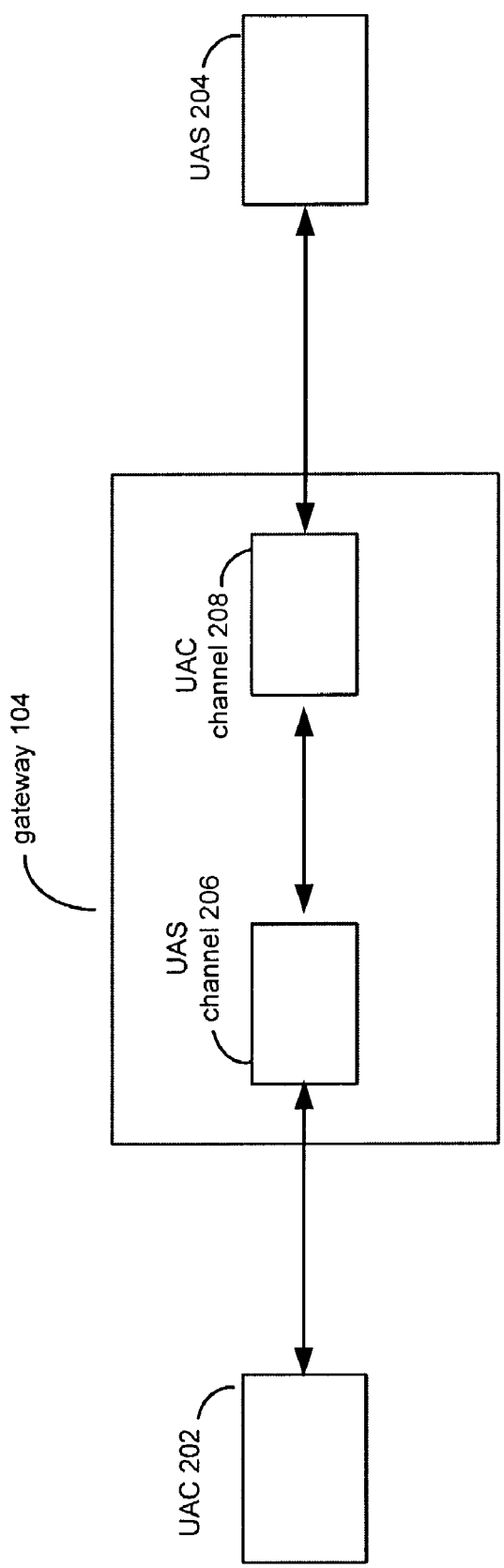
FIG. 2 illustrates a system of a first device connecting with a second device through a gateway.

Gateway 104 acts as a gateway for communications between devices in network 108 and network 110. Gateway 104 facilitates reliable call progress messaging between devices while still adhering to the SIP protocol. An example of devices communicating through gateway 104 is depicted in FIG. 2. As shown, FIG. 2 illustrates a system 200 of a first device connecting with a second device through gateway 104. The first device is referred to as a user agent client (UAC) 202 and the second device is referred to as a user agent server (UAS) 204. UAC 202 communicates with UAS 204 through UAS channel 206 and UAC channel 208.

UAC 202 is referred to as a client that initiates the communication or telephone call with UAS 204. UAC 202 may be either a SIP device 102 or a PSTN device 106. UAS 204 is referred to as a server and receives the initial communication from UAC 202. Thus, UAC 202 is in effect calling UAS 204. UAS 204 may be either a SIP device 102 or a PSTN device 106.

When UAC 202 initiates a call, UAC 202 communicates with UAS channel 206. In communicating, call progress messages are sent from UAC 202 to UAS channel 206. UAS channel 206 then communicates the call progress messages to UAC channel 208. UAC channel 208, in turn, communicates the messages to UAS 204. In one embodiment, gateway 104 initiates separate sessions with UAC 202 and UAS 204. Thus, one session is between UAC 202 and UAS channel 206 and another session is between UAC channel 208 and UAS 204. In one embodiment, gateway 104 facilitates communicates between UAC 202 and UAS 204 using systems and methods described in U.S. patent application Ser. No. 10/385,675 entitled "GATEWAY FOR CONVERSION OF MESSAGES BETWEEN MULTIPLE PROTOCOLS USING SEPARATE SESSIONS", filed on Mar. 10, 2003.

Figure 3:
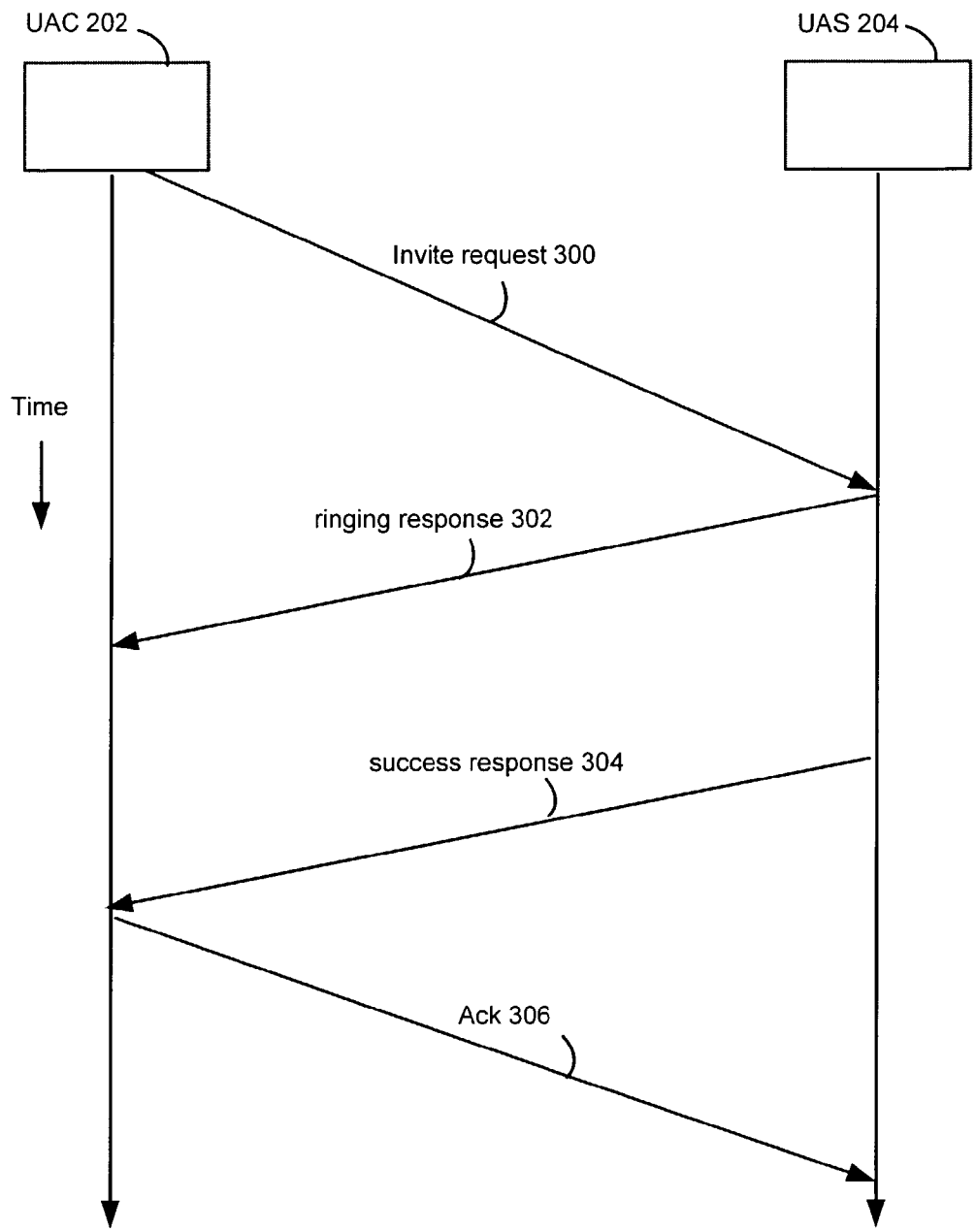
FIG. 3 illustrates a sequence of messages communicated between a first device and a second device according to one embodiment of the present invention.

FIG. 3 illustrates a sequence of messages communicated between UAC 202 and UAS 204 according to one embodiment of the present invention. FIG. 3 defines the protocol that gateway 104 enables. As will be described below, UAC 202 and UAS 204 may send additional messages that are not depicted in FIG. 3 but they are not shown because gateway 104 suppresses them. This figure illustrates only the messages that are sent and received between UAC 202 and UAS 204. In FIG. 3, it is noted that as arrows move from top to bottom, time is increasing.

In step 300, an invite request 300 is sent from UAC 202 to UAS 204. The invite request indicates that UAC 202 is trying to connect with UAS 204. According to the SIP protocol, UAC 202 is configured to repeatedly send the invite request until a provisional response is received (not shown).

A ringing response 302 is then communicated between UAS 204 and UAC 202. Ringing response 302 indicates that UAS 204 is ringing. In one embodiment, ringing response 302 may be a 18X ringing response, such as a 180 ringing response, or 18X audio inband response, such as a 183 audio inband response. Ringing response 302 is a provisional response that is a code that indicates UAS 204 is ringing. Although a 18X ringing response is used, it will be understood that a person skilled in the art will appreciate other ringing response codes that may be used.

It is noted that invite request 300 is repeatedly sent by UAC 202 until ringing response 302 is received. As will be described below, UAS 204 may send a trying response, which indicates that the invite request 100 has been received from UAC 202; however, the trying response is suppressed by gateway 104. Thus, in this case, because the trying response is not received by UAC 202, invite request 300 is still sent whereas in the standard SIP protocol, UAC 202 would have stopped sending invite request 300 when the trying response was received.

Referring back to FIG. 3, when the user picks up UAS 204, a success response 304 is sent between UAS 204 and UAC 202. Success response 304 indicates to UAC 202 that the user has picked up UAS 204. In one embodiment, success response 304 may be a 2XX final response as found in the SIP protocol. For example, success response 304 may be a 200 success response according to the SIP protocol. The call is then connected between UAC 202 and UAS 204. Also, UAC 202 sends an acknowledgment (ACK) 306 to UAS 204. The acknowledgement is any signal that may quell retransmissions of success response 304. In other embodiments, a failure response in place of success response 304 may be sent if the phone is not picked up or is busy, etc.

Accordingly, in the protocol described above, a trying response is not sent between UAS 204 and UAC 202. In one embodiment, the trying response is a 10× trying response, such as a 100 trying response as found in the SIP protocol. Because the trying response is not sent between UAS 204 and UAC 202, UAC 202 is configured by the SIP protocol to repeatedly send invite request 300. Thus, invite request 300 will be sent until a ringing response 302 is sent. Because the protocol in FIG. 3 only quells invite requests when a ringing response is received, it can be determined that a ringing response is reliably received because the invite requests will cease.

Figure 4:
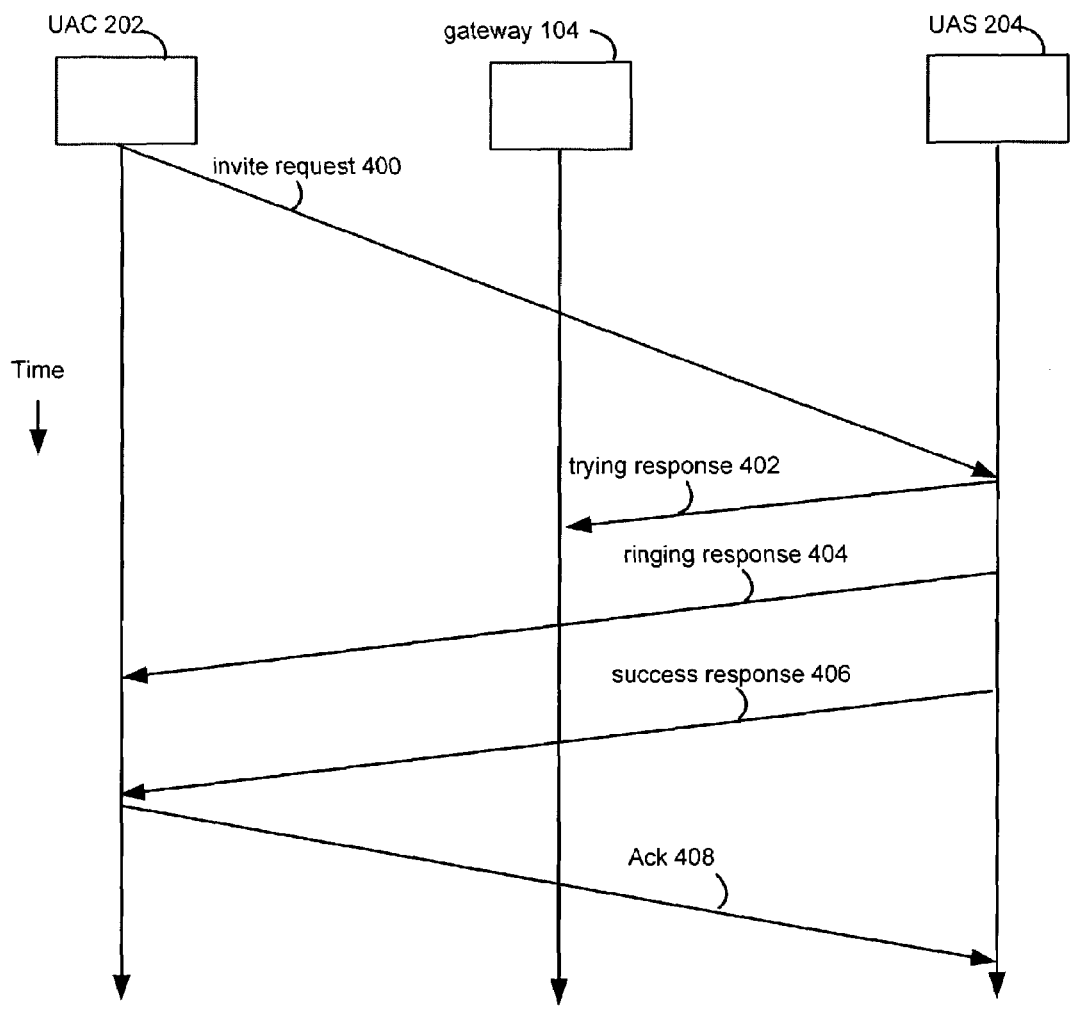
FIG. 4 shows a sequence of communications between the first device, the gateway, and the third device according to one embodiment of the present invention

FIG. 4 shows a sequence of communications between UAC 202, gateway 104, and UAS 204 according to one embodiment of the present invention. The difference between FIGS. 3 and 4 is that FIG. 4 shows the messages that are sent to gateway 104 while FIG. 3 shows only the messages sent between UAC 202 and UAS 204. In FIG. 4, communications are sent by UAC 202 and received by gateway 104. Gateway 104 then sends the communications to UAS 204. As mentioned above, as arrows move from top to bottom, time is elapsing.

UAC 202 first sends an invite request 400 to gateway 104, which then sends invite request 400 to UAS 204. UAC 202 is configured to repeatedly send invite request 400 to gateway 104 and gateway 104 is configured to repeatedly send invite request 400 to UAS 204. UAC 202 is configured to send invite request 400 repeatedly until a provisional response is received from UAS 204 through gateway 104.

When an invite request 400 is received by UAS 204, UAS 204 is configured to send a trying response 402 to gateway 104. UAS 204 is configured to send trying response 402 every time an invite request 400 is received. For example, trying response 402 may be sent each time an invite request 400 is received. The response sent, however, depends on the state of the call progress. For example, if ringing has begun, ringing response 404 may be sent or if connection failure or success has occurred, a success or failure response may be sent. In one embodiment, trying response 102 is a 1XX trying response, such as a 100 trying response as found in the SIP protocol. In another embodiment, a device of protocol other than SIP, such as a PSTN device, may generate a trying response that corresponds to a SIP trying response. In other cases, the device of another protocol, however, may not generate a trying response; in this case, gateway 104 will not have to suppress any trying responses. Although trying response 402 is repeatedly emitted by UAS 204 in response to the repeatedly sent invite request 400, gateway 104 suppresses the received trying responses 402, thereby not sending them to UAC 202. Because UAC 202 does not receive trying response 402, invite requests 400 are still repeatedly sent by UAC 202. In one embodiment, gateway 104 is configured to repeatedly send invite request 400 when a first invite request is received from UAS 202. Although UAC 202 is repeatedly sending invite requests, gateway 104 ignores those requests and continues to independently send invite requests to UAS 204. UAC 202 repeatedly sends invite requests because the SIP protocol calls for a UAC to send invite requests until a provisional response, such as a trying or ringing response is received. Gateway 104, however, receives a trying response from UAS 204 but is configured to continue to send invite requests until a ringing response is received. In the case where gateway 104 acts as a proxy and the invite messages are passed between UAC 202 to UAS 204 instead of gateway 104 reproducing messages, gateway 104 is configured to suppress any trying responses and just forward the invite messages.

Referring back to FIG. 4, UAS 204 then sends a ringing response 404 to UAC 202 through gateway 104. In one embodiment, ringing response 404 is a 18X ringing response or a 18X audio inband response, such as a 180 ringing response on 183 audio inband response as found in the SIP protocol. Ringing response 404 is sent to indicate that UAS 204 or a device associated with UAS 204 is ringing. Typically, ringing response 404 is only sent once for an invite request. Thus, most devices only send ringing response 404 once in response to invite request 400. Conventionally, in the SIP protocol, a trying response 402 would have been received by UAC 202 and invite requests 400 would have ceased. Thus, a second or any subsequent ringing responses 404 would not be invoked by repeatedly sent invite requests 400 because invite requests 400 are quelled. Because devices in the SIP protocol typically only send ringing response 404 once, ringing response 404 may not reach UAC 202 if it is lost in transit. Accordingly, a ringing response 404 may not be received by a UAC 202 using the SIP protocol. There would be no way of knowing that the ringing response was lost. In embodiments of the present invention, however, trying responses 402 are suppressed and invite requests 400 are repeatedly sent until a ringing response 404 is received. Thus, it can be determined that ringing response 404 has been received reliably if the invite requests 400 cease.

When a device, such as a telephone, is picked up by a user, UAS 204 sends a success response 406. In one embodiment, the success response may be a 2XX final response, such as a 200 success response as found in the SIP protocol. Success response 406 indicates that a user has picked up a telephone associated with UAS 204. After receiving success response 406, UAC 202 sends an acknowledgment 408 (ACK).

From the above method, ringing response 404 is sent in a reliable manner. Because trying responses 402 are suppressed and/or ignored by gateway 104, invite request 400 is repeatedly sent. Thus, it can be determined that a ringing response has been reliably sent when invite requests cease. The above method is compatible with the SIP protocol because trying responses 402 are suppressed and treated as if trying responses 402 were lost. In the case where a ringing response 404 is not received by UAC 202, it may be superseded by a success response 406. In this case, it is not necessary that the ringing response 404 is received by UAC 202.

It should be understood that the present invention as described above can be implemented in software, hardware, or a combination of both, in the form of control logic in a modular or integrated manner. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. For example, communications between protocols other than SIP and CAS, such as SS7, CAS E&M, CAS R2, ISDN, and other protocols, may be enabled. The scope of the invention should, therefore, be determined not with reference to the above description, but instead should be determined with reference to the pending claims along with their full scope or equivalents.

What is claimed is:

1. A method for communicating with a device in an unreliable messaging environment, the method comprising:
   repeatedly sending an invite signal to the device via a gateway device, wherein the gateway device receives the invite signal and forwards the invite signal to the device, and wherein the invite signal is sent until a ringing response is received from the device;
   receiving at the gateway device one or more trying responses from the device in response to the device receiving the invite signal;
   suppressing at that gateway device any trying responses received from the device;
   receiving a ringing response from the device in response to the device receiving the invite signal via a gateway device, wherein the gateway device receives the ringing response signal from the device and forwards the invite signal from the device; and
   ceasing to send the invite signal to the device when the ringing response is received from the device.

2. The method of claim 1, further comprising sending the ringing response to a second device.

3. The method of claim 2, further comprising:
   receiving a success response from the device; and
   sending the success response to the second device.

4. The method of claim 3, further comprising:
   receiving an acknowledgement signal from the second device; and
   sending the acknowledgement signal to the device.

5. The method of claim 2, wherein the second device comprises a session initiation protocol (SIP) device and the device comprises a public switched telephone network (PSTN) device.

6. The method of claim 2, wherein the second device comprises at least one of an IP device and a PSTN device and the device comprises at least one of an IP device and a PSTN device.

7. The method of claim 1, wherein the ringing response comprises at least one of a 180 ringing response and a 183 audio inband response.

8. The method of claim 1, further comprising:
   receiving a success response instead of the ringing response; and
   ceasing to send the invite signal to the device in response to receiving the success response.

9. A method for communicating between a first device and a second device via a gateway device in an unreliable messaging environment, the method comprising:
   repeatedly receiving at the gateway device an invite signal from the first device;
   repeatedly forwarding from the gateway device the invite signal to the second device;
   suppressing at the gateway device any trying responses received from the second device;
   receiving at the gateway device a ringing response from the second device in response to the second device receiving the invite signal;
   forwarding from the gateway device the ringing response received from the second device to the first device; and
   ceasing to send the invite signal to the second device when the ringing response is received by the first device.

10. The method of claim 9, further comprising sending the ringing response to the first device.

11. The method of claim 9, wherein the first device comprises a SIP device and the second device comprises a SIP device.

12. The method of claim 9, wherein the first device comprises a SIP device and the second device comprises a PSTN device.

13. The method of claim 9, further comprising:
   receiving a trying response from the second device in response to the second device receiving the invite signal.

14. The method of claim 9, further comprising:
   receiving a success response from the second device; and
   sending the success response to the first device.

15. The method of claim 14, further comprising:
   receiving an acknowledgement signal from the first device; and
   sending the acknowledgement signal to the second device.

16. The method of claim 9, wherein the ringing response comprises at least one of a 180 ringing response and a 183 audio inband response.

17. The method of claim 9, further comprising:
   receiving a success response instead of the ringing response; and
   ceasing to send the invite signal to the second device in response to receiving the success response.

18. A method for communicating with a device, the method comprising:
   repeatedly sending an invite signal to the device via a gateway device, wherein the gateway device receives the invite signal and forwards the invite signal to the device, and wherein the invite signal is sent until at least one of a 18X ringing signal and a 18X inband audio signal is received from the device;
   receiving at the gateway device a trying signal from the device in response to the device receiving the invite signal;
   suppressing at that gateway device the trying signal;
   receiving at least one of a 18X ringing signal and a 18X audio inband signal from the device in response to the device receiving the invite signal via a gateway device, wherein the gateway device receives the ringing response signal from the device and forwards the invite signal from the device; and
   ceasing to send the invite signal to the device when the at least one of a 18X ringing signal and a 18X audio inband signal is received.

19. The method of claim 18, further comprising receiving an invite signal from a second device.

20. The method of claim 19, wherein the second device comprises a session initiation protocol (SIP) device and the device comprises a public switched telephone network (PSTN) device.

21. The method of claim 19, wherein the second device comprises at least one of an IP device and a PSTN device and the device comprises at least one of an IP device and a PSTN device.

22. The method of claim 19, further comprising:
   receiving a success signal from the device; and
   sending the success signal to the second device.

23. A gateway for communicating between a first device and a second device, the gateway comprising:
   a receiver configured to receive an invite signal from the first device;
   a suppressor configured to suppress any trying signals received by the gateway;
   a transmitter configured to repeatedly forward the invite signal to the second device, and configured to cease forwarding the invite signal to the second device when the ringing signal is received.

24. The gateway of claim 23, wherein the second device comprises at least one of an IP device and a PSTN device and the second device comprises at least one of an IP device and a PSTN device.

25. The method of claim 23, wherein the first device comprises a session initiation protocol (SIP) device and the second device comprises a SIP device.

26. The gateway of claim 23, wherein the transmitter is configured to cease sending the invite signal to the second device when a success signal is received.

* * * * *